United States Patent [19]

Harrington

[11] Patent Number: 4,739,867
[45] Date of Patent: Apr. 26, 1988

[54] SELF-ALIGNING BEARING

[75] Inventor: Richard F. Harrington, Lincolnwood, Ill.

[73] Assignee: Aetna Bearing Company, Chicago, Ill.

[21] Appl. No.: 879,892

[22] Filed: Jun. 30, 1986

[51] Int. Cl.⁴ .............................................. F16D 23/14
[52] U.S. Cl. .................................. 192/98; 192/110 B; 384/495; 384/536; 384/612
[58] Field of Search ............... 192/98, 110 B; 384/495, 384/536, 558, 582, 612

[56] References Cited

U.S. PATENT DOCUMENTS

| | | |
|---|---|---|
| 2,823,967 | 2/1958 | Harrington . |
| 3,416,637 | 12/1968 | Maurice .......................... 192/98 |
| 3,625,327 | 12/1971 | Birdsey ........................ 192/110 B |
| 3,788,437 | 1/1974 | Camp ............................... 192/98 |
| 3,882,979 | 5/1975 | Limbacher et al. ............. 192/98 |
| 3,920,107 | 11/1975 | Limbacher ....................... 192/98 |
| 4,026,398 | 5/1977 | Matyschik et al. .............. 192/98 |
| 4,181,380 | 1/1980 | Vinel et al. . |
| 4,276,974 | 7/1981 | Ladin .............................. 192/98 |
| 4,305,492 | 12/1981 | Mori et al. ....................... 192/98 |
| 4,365,850 | 12/1982 | Perrichot et al. . |
| 4,555,007 | 11/1985 | Harrington et al. ............ 192/98 |
| 4,565,272 | 1/1986 | Miyahara ........................ 192/98 |
| 4,566,578 | 1/1986 | Leigh-Monstevens et al. ... 192/98 |
| 4,579,465 | 4/1986 | Horner .......................... 384/612 |
| 4,608,741 | 9/1986 | Mallet ..................... 192/110 B X |

FOREIGN PATENT DOCUMENTS

| | | | |
|---|---|---|---|
| 2,457,352 | 6/1976 | Fed. Rep. of Germany ...... 384/495 |
| 2507194 | 9/1976 | Fed. Rep. of Germany ...... 384/495 |
| 1454790 | 11/1976 | United Kingdom .................. 192/98 |
| 2070182 | 9/1981 | United Kingdom .................. 192/98 |
| 2096263 | 10/1982 | United Kingdom .................. 192/98 |

Primary Examiner—Rodney H. Bonck
Assistant Examiner—Richard M. Lorence
Attorney, Agent, or Firm—Trexler, Bushnell, Giangiorgi & Blackstone, Ltd.

[57] ABSTRACT

A self-aligning clutch release bearing and carrier sleeve assembly includes a carrier sleeve which defines a first axis and a bearing having a generally annular thrust face adapted to be brought in engagement with rotating clutch fingers or the like of a clutch mechanism, which clutch fingers are rotating about a second axis which may or may not be coincidental with said first axis. The bearing and carrier sleeve assembly is adapted to adjust the rotational orientation of the bearing to coincide with the second axis of rotation, and comprises a bearing including a radially inwardly extending shoulder portion which terminates at a position radially spaced apart from the carrier sleeve. A flexible mounting member is interposed radially between the bearing shoulder portion and the carrier sleeve for mounting the bearing to the carrier sleeve in a resilient, self-aligning condition, such that the bearing can adjust its position relative to the carrier sleeve to align the thrust face coaxially with said second axis for engagement of the clutch fingers with the thrust face.

18 Claims, 2 Drawing Sheets

SELF-ALIGNING BEARING

BACKGROUND OF THE INVENTION

This invention relates generally to clutch release type thrust bearings, and more particularly concerns a clutch release bearing mounted to a carrier sleeve in such a way as to adjust the bearing to correct or accommodate to slight misalignments between the bearing thrust face and clutch fingers of an associated clutch mechanism during engagement therebetween, and thereafter automatically realign or recenter the bearing relative to its carrier sleeve, if necessary.

Automative clutch throw-out or release bearings are commonly used to provide a force-transmitting device between a foot-operated clutch pedal and a plurality of rotating clutch release fingers of an associated clutch mechanism. Production of high-quality automotive clutch assemblies, clutch bearings and associated parts in substantial quantities requires that the parts be manufactured and assembled at minimum cost, and yet operate with a high degree of reliability over a long service life. This includes the requirement that the parts be designed and arranged to operate in spite of slight part misalignments encountered either in assembly or during operation. That is, such misalignments may arise as a result of minor variations in part sizes and shapes, even though each part may be within manufacturing tolerances. Such misalignment can also occur when the parts are installed in the vehicle, due to the rigors of substantial operating forces over long periods of use to which the parts are subjected. By way of example, clutch throw-out bearing assemblies are shown in U.S. Pat. Nos. 3,909,086 and 4,406,436.

As indicated above, the bearing of the present invention is designed to have some amount of adjustability of its position relative to the carrier sleeve. This is done to permit the desired alignment of the bearing thrust face with the clutch fingers during engagement therebetween, and yet allow the bearing to be self-aligning or self-centering to return to substantial coaxial alignment with the associated carrier sleeve upon disengagement with the clutch fingers. In this way, the bearing of the invention may adjust to misalingments which may occur from time to time during operation. Moreover, the bearing may also be used for a constant running clutch wherein the bearing rotates with the clutch fingers whenever the engine is running. In either application, the bearing of the invention is self-aligning with respect to the clutch fingers, even though some misalignment may occur therebetween and even though this misalignment may not be constant but may vary over the service life of the clutch assembly.

The present invention concerns a novel mounting arrangement making use of a resilient or flexible annular mounting member which is mounted intermediate the carrier sleeve and the bearing and mounts the latter to the former. Advantageously, the resilient flexible annular ring is of somewhat smaller diameter than the portion of the carrier sleeve about which it mounts, such that it is deformed somewhat upon being stretched over and mounted to the carrier sleeve. This deformation is such that an inner diameter surface of the ring abuts the carrier sleeve, while an outer diameter portion extends axially rearwardly and somewhat radially outwardly of the carrier sleeve so as to abut and mount the bearing. As an additional advantage, this flexible ring is the only structure utilized to assemble the bearing to the carrier sleeve. Yet, it provides the desired degree of resiliency for permitting any necessary adjustment of the bearing relative of the carrier sleeve to assure proper alignment of the bearing thrust face with the clutch fingers in service. In this regard, while the deformed ring permits the desired degree of resiliency in the radial direction, it is quite resistant to compressive forces applied generally in the direction for removal of the bearing from the sleeve, so as to reliably maintain the bearing and carrier sleeve held together in assembled condition.

BRIEF DESCRIPTION OF THE DRAWINGS

The features of the present invention which are believed to novel are set forth with particularlity in the appended claims. The organization and manner of operation of the invention, together with further objects and advantages thereof, mauy best be understood by reference to the following description taken in connection with the accompanying drawings in the several figures of which like reference numerals identify like elements, and in which:

DETAILED DESCRIPTION OF THE ILLUSTRATED EMBODIMENT

Figure 1:
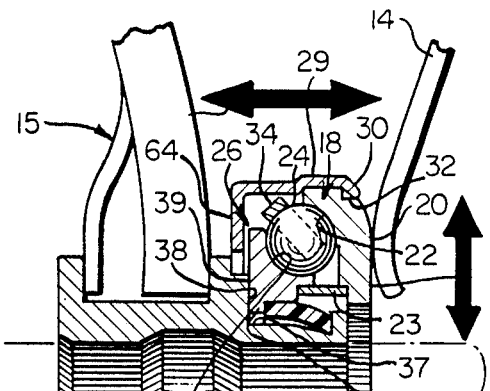
FIG. 1 is a side elevation, partially broken away and partially in section illustrating a thrust bearing and carrier sleeve assembly in accordance with the present invention.

Referring now to the drawings and initially to FIG. 1, a novel clutch bearing or bearing assembly 10 is adapted to be installed upon a generally cylindrical carrier sleeve 12 for interengagement with a plurality of rotating clutch fingers 14 of a clutch mechanism. These clutch fingers 14 normally rotate about a center line or axis of rotation A. The carrier sleeve 12 is generally of an elongate tubular form and mounted to be moved axially on a shaft 16 shown in phantom line, such that shaft 16 and carrier sleeve 12 define a center line or axis B.

Figure 2:
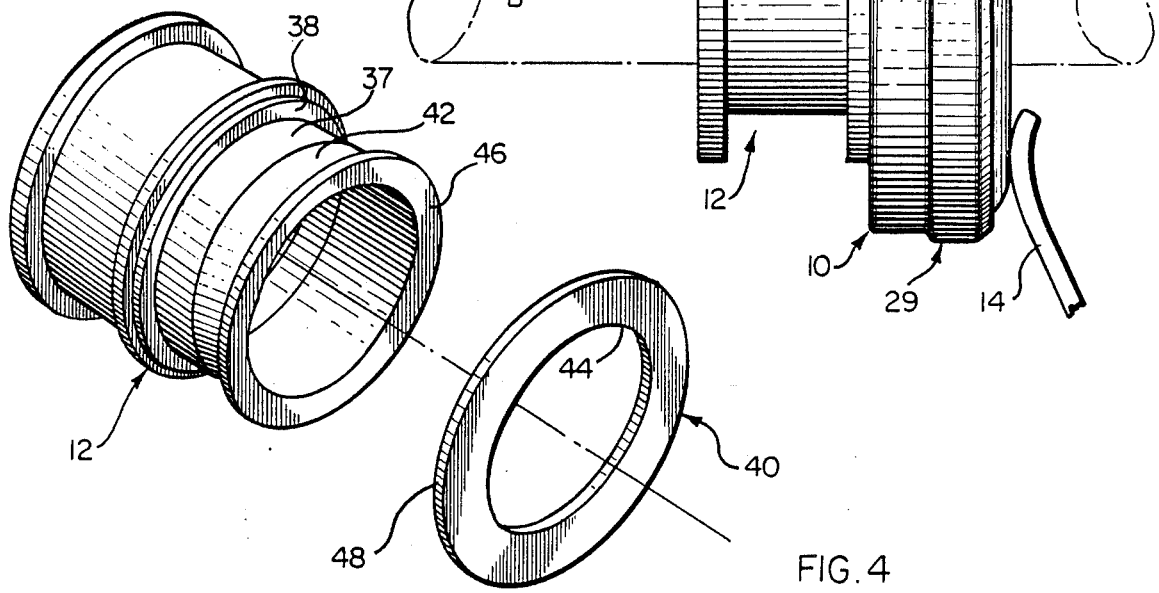
FIG. 2 is an exploded perspective view illustrating a carrier sleeve and a flexible mounting member in accordance with the invention just prior to the preassembly thereof.
Figure 4:
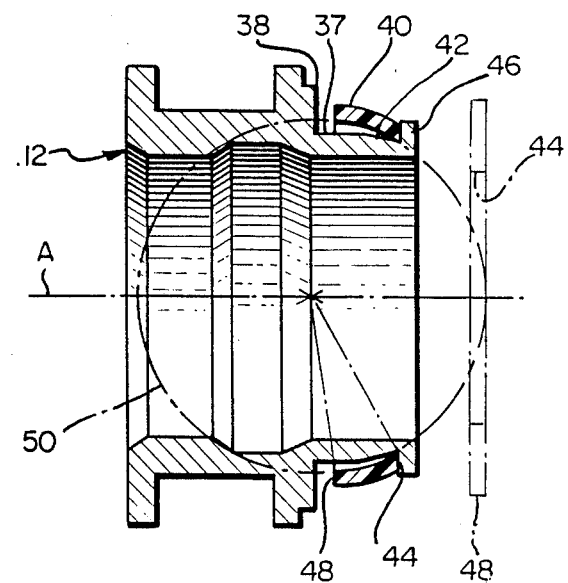
FIG. 4 is a sectional view similar to FIG. 1 illustrating the assembly of the flexible mounting ring or member with the carrier sleeve.

For purposes of illustration, the axis B of rotation of the clutch fingers is not coincidential with the axis A of rotation of the carrier sleeve 12, so as to demonstrate the slight misalignment between these axes which may occur in use or assembly. As will be seen presently, in accordance with the invention a novel resilient mounting means or arrangement as illustrated further in FIGS. 2 and 4 is utilized for mounting the bearing 10 to the carrier sleeve 12. This resilient mounting is such as to permit a given amount of resilient variation in the relative radial position of the bearing 10, for generally coaxial alignment thereof with the axis B of the rotating clutch fingers 14, without regard for the misalignment which may occur between the axes A and B as just described.

Referring initially to the construction of the bearing or bearing assembly 10, it should be initially noted that other specific constructions or configurations may be utilized without departing from the invention, the illustrated structure being by way of example only. The bearing assembly 10 includes a first annular member 18 which has formed on one surface thereof a generally annular, flat thrust face 20 for engagement with the clutch fingers 14 so as to transmit a loading force acting in the axial direction. In this regard, the carrier sleeve 12 is axially slideable with respect to shaft 16 on which it is carried. Upon depression of a clutch pedal, a suitable interconnecting linkage mechanism, a portion of which is diagrammatically indicated at 15, is coupled with the carrier sleeve 12, and is operative for axially moving the same relative to the shaft 16. The first annular member 18 also defines at a second surface thereof, generally opposite thrust face 20, a first annular raceway 22.

In the illustrated embodiment, the first annular member is generally cup-shaped, thereby defining a suitable semi-cylindrical configuration of annular raceway 22 for surface-to-surface engagement with a plurality of generally spherical ball bearing elements 24. A second annular member 26 defines a second annular raceway 28 which faces generally oppositely and inwardly with respect to first raceway 22 so as to engage the ball bearing elements 24 therebetween. The bearing further includes a generally annular housing or shell member 29.

In the illustrated embodiment, the shell is affixed to the first annular member 18 at a radially inwardly bent forward lip portion 30 thereof which engages a radially inwardly extending forward shoulder portion 32 of annular member 18 radially outside of thrust face 20 formed at the front or forward surface thereof. The housing or shell member 29 in the illustrated embodiment is generally L-shaped in cross-section and extends downwardly to a point axially spaced from a rear surface of second annular member 26. The shell 29 terminates at a position radially spaced from the carrier sleeve 12. Accordingly, the housing or shell member 29 in the illustrated embodiment rotates in unison with first annular member 18, which in turn rotates in unison with the clutch fingers 14 upon engagement therebetween. A generally annular sealing member or ring 23 may also be provided intermediate the radially inner surfaces of respective annular members 26 and 18, which may be provided with further annular shoulder portions for positioning and accommodating this sealing ring 23.

The associated clutch may be of a constant running type, wherein which the thrust face 20 and annular member 18 will engage and rotate in unison with the clutch fingers 14 with a slight preloading in the axial direction, whenever the clutch is rotating. It will be further noted in this regard that both of the first and second annular members 18 and 26 also terminate at a position radially spaced apart from the carrier sleeve 12, such that neither directly engages the radially outwardly facing mounting surface or area 37 of the carrier sleeve.

The ball bearing elements 24 in the illustrated embodiment are carried by a combination carrier-spacer ring 34 in an evenly spaced array. Moreover, in the illustrated embodiment, it will be noted that each of the raceways 22 and 28 engages the ball bearing elements 24 over a portion of its respective peripheral surface which defines an arc of somewhat greater than 90 degrees. This arc of engagement extends from a point somewhat beyond a radial axis or centerline through bearing elements 24 to a point somewhat beyond an axial centerline or axis thereof, the radial and axial directions being with reference to axes A and B, previously described. This overlap or "over-center contact" is believed to further enable the bearing to handle forces in the radial direction, which might otherwise tend to separate the bearing components. That is, when the bearing is rotating, centrifugal forces tend to urge the ball bearing elements 24 radially outwardly which would tend to separate the raceways 22 and 28. However, the overlapping design of the raceways relative to the ball bearing elements in the present design overcomes the force urging the balls outwardly, and thus accommodates some degree of radial loading.

In addition to the raceway surface 28 on second annular member 26, it will be noted that this member 26 also includes a radially inwardly extending or projecting annular shoulder portion 36 which terminates at a position radially spaced from the radially outer surface 37 of the carrier sleeve 12. However, the carrier sleeve 12 includes an increased diameter or radially outwardly extending abutment surface or shoulder portion 38 which engages a rearwardly facing, generally radially extending annular rear surface 39 of the annular member 26. In this regard, this surface 39 faces generally oppositely and parallel with annular front thrust face 20. It will also be noted that the inner rear surface of the shell or housing member 28 is axially spaced from this surface 39.

Referring now also to the remaining drawing figures, in accordance with the invention, flexible mounting means 40, which takes the form of a generally annular, resilient ring member, is interposed between the bearing 10 and carrier sleeve 12 for mounting the bearing to the carrier sleeve in a resilient, self-aligning condition. This resilient mounting is such that the bearing can adjust its position in a radial plane relative to the axis A so as to align the thrust face 20 coaxially with the second axis B for engagement with the clutch fingers 14. Moreover, the resiliency of this mounting is such that upon disengagement of the thrust face with the clutch fingers, the bearing returns to a substantially centered position relative to axis A. Moreover, it is ring 40 alone which mounts the bearing 10 to the carrier sleeve 12 and retains the former against axial movement relative to the latter.

The flexible annular mounting member or ring member 40 is sized to fit intermediate the carrier sleeve 12 and the bearing 10 to resiliently support the bearing radially spaced from the carrier sleeve, as will be appreciated from the foregoing description. More particularly in this regard, and referring to FIGS. 2 and 4, the carrier sleeve 12 surface portion 37 comprises a generally cylindrical bearing-receiving or mounting surface or portion which terminates at one end thereof at the radially extending shoulder 38 previously described. At an opposite end of surface 37 from the shoulder or abutment surface 38, is a generally annular groove 42 which defines a shoulder 46 and receives therein an inner diameter surface or portion 44 of the ring member 40.

Importantly, before mounting, the ring member 40 is substantially flat and annular defining an inner diameter surface 44 which is substantially less than the outer diameter of the groove 42. Preferably, this inner surface 44 of the ring 40 is on the order of 20% smaller in diameter than the outer diameter of groove 42. Accordingly, the ring member 40 is resiliently deformed or flexed upon assembly with the groove 42 of the carrier sleeve 12. This flexing is indicated in FIG. 4, wherein the unstressed ring 40 and its inner diameter 44 is illustrated in phantom line immediately adjacent the stressed and flexed or deformed ring 40 mounted to the groove 42 of carrier sleeve 12.

Figure 3:
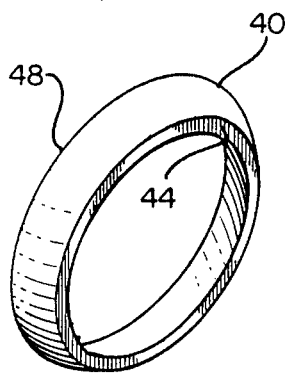
FIG. 3 is a perspective view similar to FIG. 2, illustrating the deformation of the flexible mounting member which occurs upon its assembly with the carrier sleeve.

The general form of the stressed or flexed ring 40 is also illustrated in FIG. 3, which will be understood to be by way of illustration only, with the carrier sleeve 12 having been omitted to facilitate the generally isometric or perspective showing of the flexed or deformed mounting ring 40 therein. In the illustrated embodiment, the stressed or flexed ring member 40 takes on a generally hollow, annular, spherical sector-like configuration, extending axially rearwardly with respect to thrust face 20 and radially outwardly of the axis A (see FIG. 4). This generally spherical sector-like configuration is indicated by a circle 50 in phantom line in FIG. 4, which designates a cross-section through a sphere of like diameter. It will be noted that the curvilinear condition of the resilient ring 40 generally conforms to a sector of the surface of the sphere defined by circle 50.

In accordance with the preferred form of the invention illustrated, the groove 42 is a generally converging or wedge-shaped groove which converges from the surface 37 of the carrier sleeve forwardly, that is in the direction toward the thrust face 20. The surface 37 and groove 42 together define what may be referred to as a bearing mounting portion of the carrier sleeve 12. The groove 42 terminates in as well as defines in part the radially extending annular shoulder portion 46 of the carrier sleeve which is generally spaced apart from and parallel with the shoulder or abutment portion 38 previously described. The ring member 40 is mounted such that its inner diameter edge or surface 44 engages this radial shoulder 46. Preferably in this regard, the annular ring member 40 is formed from an elastomeric rubber-like material, which may comprise a rubber or a synthetic, rubber-like substance.

Upon assembly thereof, as best viewed in FIG. 4, the radially outwardly extending abutment portion or shoulder 38 is generally axially spaced from and faces an outer diameter peripheral surface 48 of the mounting ring member 40. That is, this latter surface 48 is oriented in a generally parallel and axially spaced apart condition relative to abutment surface 38 upon deformation of ring 40 into the spherical sector-like configuration illustrated in FIGS. 3 and 4, as described above. The axial spacing between these two surfaces 38 and 48 is such as to frictionally engage the shoulder portion 36 of annular raceway member 26 therebetween, as shown in FIG. 1. Hence, the annular member 26 is held against axial movement between the abutment portion or surface 38 on the one side and the outer peripheral surface 48 of the flexible ring on its other side. This substantially precludes any axial movement of the bearing 10 or 26 relative to the carrier sleeve 12.

In this latter regard, it should be appreciated that the flexible ring 40, especially when in the stressed condition assumed upon mounting to the carrier sleeve, is greatly resistant to axial compressive forces applied thereto, that is, compressive forces tending to compress the already stressed ring 40 in the generally axial direction as viewed in FIG. 4.

Stated another way, the ring is quite strong in compression, that is, when compressive forces are applied to the radially inner and/or outer surfaces 44 and 48 thereof. However it will be noted that the ring is somewhat flexible in the radial direction, being subject to some further radial deformation from the generally spherical sector-like configuration assumed upon mounting of the bearing 10 therewith. In this regard, it will be seen that the relative radial spacing of the two annular members 18 and 26 as well as that of the casing or shell 28 relative to the carrier sleeve 12 is generally defined by the radial position or orientation of the ring 40. This radial position is of course subject to change as the ring 40 flexes or resiliently deforms further in response to radial forces encountered during loading of the bearing upon contact with the clutch fingers 14.

Advantageously, assembly of the bearing 10 to the carrier sleeve 12 is greatly simplified and facilitated by the mounting ring 40 of the invention. In this regard, it is contemplated that the mounting ring 40 will first be stretched and engaged over the carrier sleeve 12 so as to assume the condition illustrated in FIG. 4, as described above. Thereafter, the bearing 10 may be relatively easily mounted by pressing it axially rearwardly over the carrier sleeve 12 and ring 40 until the shoulder passes completely by the end 48 of ring 40. Advantageously, the ring 40 will readily flex radially inwardly somewhat to allow passage of shoulder portion 36 thereover, and thereafter resiliently return into engagement therewith as illustrated in FIG. 1. As also mentioned above, while movement of the bearing in the axial direction for assembly is relatively simple, once so assembled the mounting ring 40 strongly resists axial forces in the opposite direction, tending to compress the mounting ring, thus reliably holding the bearing in assembled condition relative to the carrier sleeve 12.

In accordance with two further embodiments of the invention, an additional tilting or canting motion of the bearing, and hence of the thrust face may also be achieved by an additional modification of the configuration illustrated and described above. This additional tilting or canting of the thrust face is permitted in a plane generally transverse to the carrier sleeve axis, so as to accommodate any slight misalignment which may occur in this transverse plane as between the thrust face and the clutch fingers. Such misalignment is often referred to in the art as a "off-square" condition. That is, both the thrust face and the contacting surfaces of the clutch fingers should ideally be at right angles to the carrier sleeve axis or in a "square" condition. However, this is not always the case.

Figure 5:
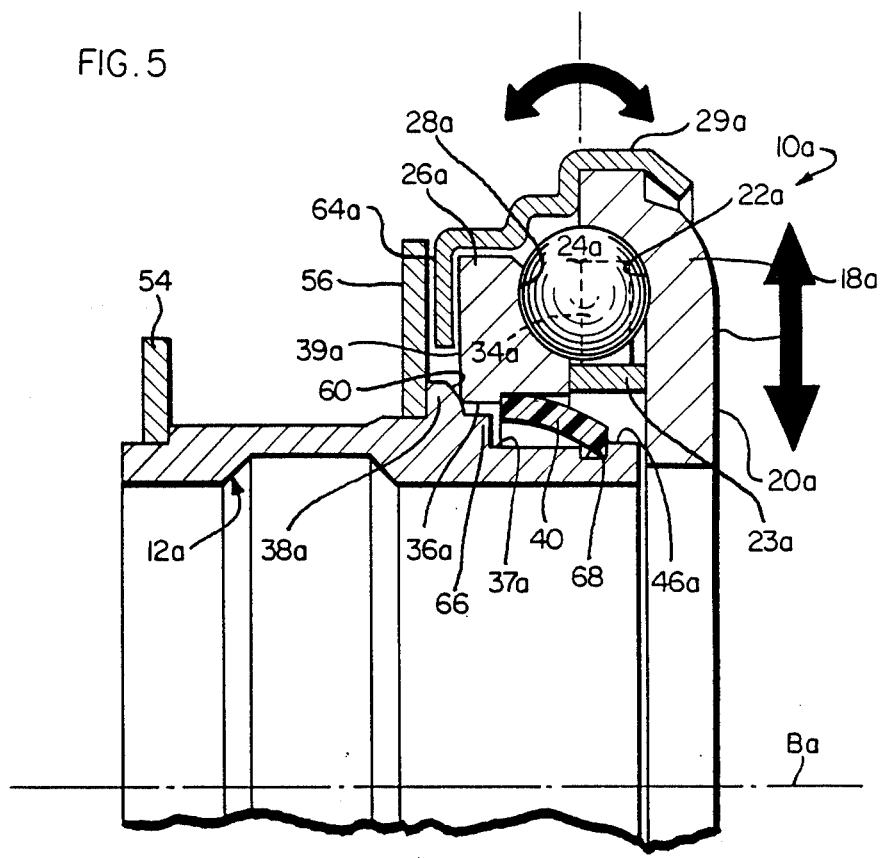
FIG. 5 is a partial sectional view somewhat similar to FIG. 1, showing a bearing and carrier sleeve in accordance with a second embodiment of the invention.
Figure 6:
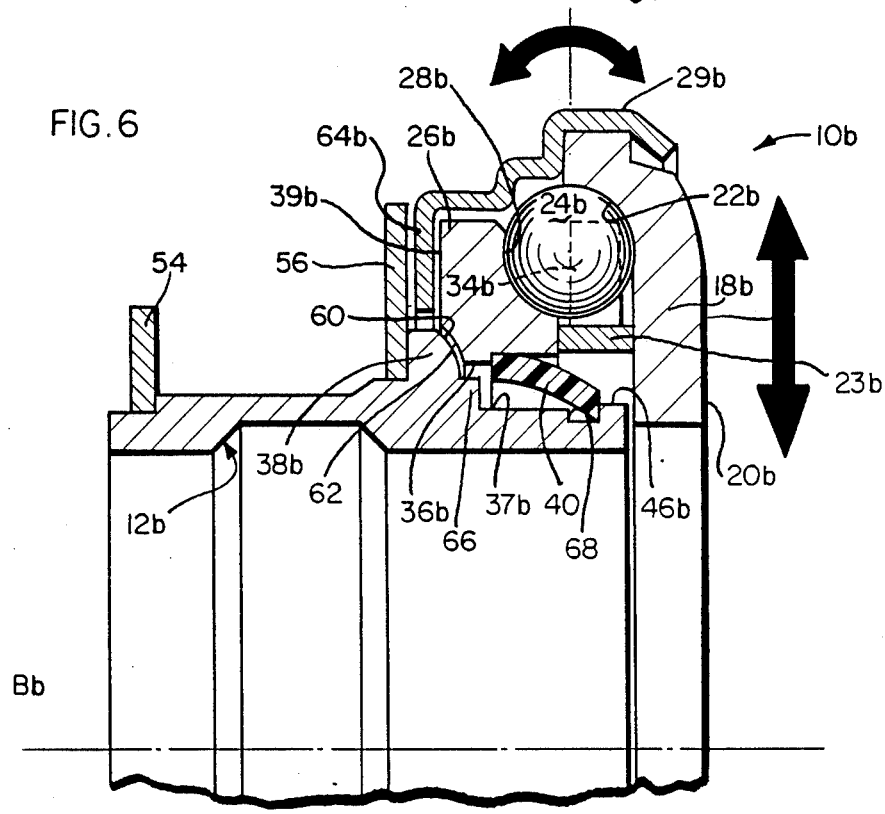
FIG. 6 is a partial sectional view similar to FIG. 5, showing a bearing and carrier sleeve in accordance with a third embodiment of the invention.

Advantageously, the bearing and carrier sleeve assembly as shown in FIGS. 5 and 6 permit some additional resilient movement of the bearing relative to the sleeve to overcome and accommodate such an off-square condition or misalignment. More particularly, these novel structures permit a compensating tilting or canting motion of the bearing relative to the carrier sleeve axis, upon engagement of the thrust face with the clutch fingers.

Referring now more particularly to FIGS. 5 and 6, those elements and structures which are generally similar in form and/or function to elements previously described with reference to FIG. 1 are denoted by like reference numerals with respective suffixes a and b. Additional outwardly projecting annular rings 54, 56 are engaged with the carrier sleeves 12a and 12b respectively for receiving a clutch fork release assembly or member 15, similar to that indicated generally in FIG. 1.

As in the embodiment of FIG. 1, the shell or housing 29a, 29b engages the front or first annular member 18a, 18b which defines the thrust face 20a, 20b at its front surface and annular raceway 22a, 22b generally at its rear surface. Hence, this shell or housing member is spaced apart form the second annular member 26a, 26b to allow relative rotation between the annular members and raceways, with the bearing members 24a, 24b being retained therebetween.

Departing from the embodiment of FIG. 1, the radially outwardly projecting or extending abutment surface or shoulder portions 38a, 38b have generally radially outwardly and axially rearwardly arcuately curved surfaces 60 which face generally in the direction of thrust faces 20a, 20b, respectively. These arcuately curved surfaces are preferably generally spherical in curvature or configuration. Advantageously, these arcuately or spherically curved surfaces 60 permit radial and axial sliding motion of respective shoulder portions 36a, 36b of the respective bearings relative thereto.

This sliding, tilting motion of these shoulder portions permits a corresponding tilting or canting motion of the respective bearings, and hence of thrust faces 20a, 20b thereof relative to the carrier sleeve axes Ba and Bb. In particular, this arrangement allows a certain amount of tilting or canting of the thrust face relative to a plane perpendicular to the carrier sleeve axis to permit substantially the desired alignment for an an even force of engagement of all of the circumferentially arrayed fingers 14 about the entire surface of the thrust face 20a, 20b.

As previously indicated, the tilting or canting of the plane of the thrust face 20a or 20b relative to the plane generally defined by the surfaces of finger 14 which are intended to engage the thrust face is often referred to as an "off-square" condition. Advantageously, the flexible nature of the ring 40 permits a slight amount of compensating tilting or canting of the bearing to occur relative to the carrier sleeve so as to correct any such off-sqaure condition or misalignment upon engagement of the thrust face 20a or 20b with the clutch fingers. While the resilient flexible mounting ring 40, as indicated above, generally resists compressive forces thereupon due to forces tending to dislodge the bearing from the carrier sleeve following assembly thereof, there is nonetheless sufficient flexibility in the mounting ring to permit the necessary amount of tilting or canting of the bearing relative to the sleeve axis to correct any such off-square condition or misalignment. In the same fashion as with the case of relative axial misalignments discussed above, the amount of tilting or canting corrective motion may of course vary from time to time to accommodate variations in the off-square condition which may occur during service, due to wear or the like.

In the embodiment of FIG. 5, the rear edge of shoulder portion 36a is permitted to ride upon the curved or arcuate surface 60 to accommodate such tilting or canting motion as may be necessary to achieve the desired alignment. However, in the embodiment of FIG. 6, a facing surface portion of the shoulder 36b and an adjacent facing surface portion of the annular member 26b are also arcuately or spherically curved as indicated at reference numeral 62 for complementary engagement with the surface 60, to further accommodate the sliding, tilting motion therebetween.

Moreover, and referring now also again to FIG. 1, it will be noted that bearings of the type disclosed herein are often filled with a grease or grease-like lubricating material. In order to retain this lubricating material, the configuration of the bearings illustrated in FIGS. 1, 5 and 6 provide the seal member 23, 23a, 23b as previously described. Moreover, in order to guard against loss of lubricant generally at a rear portion of the bearing, it will be noted that the respective shoulders 38, 38a, 38b and the relatively close engagement with facing shoulders or surfaces 36, 36a, 36b, including the above-described contact of surfaces 60 and 62, generally tend to prevent escape of lubricant material.

Also, rearwardly overlapping lip portions 64, 64a, 64b of the respective shell members 29, 29a and 29b with respect to annular members 26, 26a and 26b, aid in such lubricant retention. Moreover, it will be noted that the positioning of the annular sealing ring 40 itself between the carrier sleeve and the bearing also aids in providing a partial seal or backup to seal 23, 23a, 23b with respect to the lubricant material about the bearing elements 24, 24a, 24b. Further to this end, it will be noted that in the embodiments of FIGS. 5 and 6, the thrust faces 20a, 20b extend radially inwardly, to a point somewhat radially inwardly of an outer edge of respective projecting shoulder portions 46a, 46b of the carrier sleeves to provide some further sealing against the escape of lubricant therethrough.

Hence, the configuration of the shell 29, 29a, 29b and its overlapping of the rear surface portions 39, 39a, 39b of the respective second annular members, together with the noted configuration of the respective shoulder portions defines a generally serpentine, labyrinthine or circuitous path for any escaping lubricant, thus tending to generally retard or oppose the escape thereof from the area about the bearing elements and raceways. Further to this end, in the embodiments of FIGS. 5 and 6, it will be noted that the shoulder portions 38a, 38b extend from a first or radially inner shoulder portion 66 in a generally step-like configuration to further define the circuitous or labyrinthine seal configuration.

It will additionally be noted that the wedge-shaped groove or recess 42 described above with reference to the embodiment of FIG. 1 has been replaced by a generally right cylindrical groove 68 in the embodiments of FIGS. 5 and 6. However, functionally these grooves or recesses act similarly in receiving and retaining the inner diameter surface portions of the respective flexible annular mounting rings 40.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A self-aligning clutch release bearing and carrier sleeve assembly including a carrier sleeve having a bearing mounting portion which portion has a first axis and a bearing having a generally annular thrust face adapted to be brought into engagement with rotating clutch fingers or the like of a clutch mechanism, which clutch fingers are rotating about a second axis, said bearing and carrier sleeve assembly being adapted to adjust the rotational orientation of said bearing to coincide with said second axis of rotation, said bearing and carrier sleeve assembly comprising: a radially inwardly projecting shoulder portion formed on said bearing terminating at a position radially spaced apart from said carrier sleeve bearing mounting portion; and flexible mounting means comprising a flexible annular ring of generally smaller inner diameter than the outer diameter of said carrier sleeve mounting portion prior to mounting of the ring to the carrier sleeve and said ring, when mounted to said carrier sleeve being stretched over said carrier sleeve bearing mounting portion such that its inner diameter engages said carrier sleeve and its outer diameter engages said bearing shoulder portion for mounting said bearing to said carrier sleeve in a resilient, self-aligning condition, such that said bearing can adjust its position relative to said first axis to align said thrust face coaxially with said second axis for engagement of said clutch fingers with said thrust face; wherein said carrier sleeve has a cylindrical surface portion comprising said bearing mounting portion and having a first annular shoulder therein for abutting said inner diameter portion of said ring, and wherein said ring member is substantially flat and annular in configuration prior to assembly with the carrier sleeve mounting portion, whereby said ring in use when mounted about said carrier sleeve mounting portion is flexed into a substantially annular spherical sector-like configuration extending axially rearwardly of said thrust face and radially outwardly of said first axis.

2. An assembly according to claim 1 wherein said bearing includes a first annular member having said annular thrust face on one surface thereof for engaging said clutch fingers and a first annular raceway on a generally oppositely oriented surface thereof; a second annular member having a second annular raceway formed thereon in facing relation to said first annular raceway, a plurality of bearing elements disposed between and engaging the respective raceways, and an annular shell housing member overlying the first and second annular members and adapted to be mounted in surrounding relation to said carrier sleeve; said first and second annular members and said shell housing member each terminating at a position radially spaced apart from a respective facing surface portion of said carrier sleeve; said flexible annular ring being sized to fit intermediate said carrier sleeve and said bearing and to resiliently support said bearing radially spaced from said carrier sleeve.

3. An assembly according to claim 2 wherein said flexible annular ring outer diameter is mounted in engagement with an inner diameter of said second annular member which defines said shoulder portion.

4. An assembly according to claim 2 wherein said second annular member has a radially inwardly extending portion defining said shoulder portion for engagement with a radially outer surface portion of said flexible ring member.

5. An assembly according to claim 2 wherein said first annular member engages said shell housing member for rotation in unison therewith, and wherein said shell housing member is spaced apart from said second annular member so as to permit relative rotation between the first and second annular members.

6. An assembly according to claim 2 wherein said first annular member is substantially cup-shaped so as to define said first annular raceway therein.

7. An assembly according to claim 2 wherein said bearing elements comprise a plurality of spherical ball elements engaging the respective raceways with respective surface-to-surface contacts.

8. An assembly according to claim 1 wherein said first annular shoulder is formed by a groove which is generally wedge-shaped, converging from an outer diameter of said carrier sleeve cylindrical surface portion in a direction toward said thrust face, and wherein said ring member is mounted to said groove such that a radially inner end surface thereof engages said first annular shoulder.

9. An assembly according to claim 8 wherein said carrier sleeve has an abutment portion extending radially outwardly of said groove and spaced apart from said groove, such that said bearing shoulder portion is held axially between said abutment portion on one side thereof and an outer peripheral surface of said flexible ring member on the side thereof opposite said one side.

10. An assembly according to claim 1 wherein said flexible annular ring member is formed from an elastomeric rubber-like material.

11. A self-aligning clutch release bearing and carrier sleeve assembly including a carrier sleeve which has a first axis and a bearing adapted to be brought in engagement with rotating clutch fingers or the like of a clutch mechanism, which clutch fingers are rotating about a second axis, said bearing and carrier sleeve assembly being adapted to adjust the rotational orientation of said bearing to coincide with said second axis of rotation, said bearing and carrier sleeve assembly comprising: annular thrust face means on one surface of said bearing for engaging said clutch fingers; said bearing terminating at a position spaced apart from said carrier sleeve; and flexible mounting means interposed radially between said bearing and said carrier sleeve for mounting said bearing to said carrier sleeve in a resilient, self-aligning condition, such that said bearing can adjust its position relative to said first axis to align said thrust face coaxially with said second axis for engagement of said clutch fingers with said thrust face; wherein said flexible mounting means comprises a flexible annular ring member mounted intermediate said carrier sleeve and said bearing to resiliently support said bearing radially spaced from said carrier sleeve and also to maintain said bearing mounted to said carrier sleeve; wherein said carrier sleeve has an annular surface portion having a first annular shoulder means; and wherein said bearing has a shoulder formed on the inner periphery thereof to define a second annular shoulder means; and wherein said flexible annular ring member is initially a flat, annular member having an inner diameter less than an outer diameter of said annular surface portion of the carrier sleeve and upon mounting to said carrier sleeve assumes a substantially annular spherical sector-like configuration extending axially rearwardly of said thrust face and radially outwardly of said first and second axes such that an inner diameter surface of said ring engages the first annular shoulder means on said carrier sleeve and an outer diameter surface engages the second annular shoulder means on said bearing such that the engagement of said inner and outer diameter surfaces with said first and second shoulder means serves to prevent axial disengagement of the bearing from the carrier sleeve, while the disposition of said flexible annular ring member radially between said bearing and said carrier sleeve permits said bearing to move radially relative to said carrier sleeve to adjust its position to align the thrust face means with said second axis to attain generally coaxial engagement with said clutch fingers.

12. An assembly according to claim 11, wherein prior to mounting on the sleeve said ring member is substantially flat and annular in configuration and wherein an inner diameter of said ring member is less than the outer diameter of said annular surface portion of the carrier sleeve on which it is mounted, whereby said ring member is flexed into a substantially annular spherical sector-like configuration extending axially rearwardly of said thrust face and radially outwardly of said axis upon mounting thereof about said carrier sleeve, such that an inner diameter surface of said ring engages the carrier sleeve and an outer diameter surface engages the bearing.

13. An assembly according to claim 12, wherein said first annular shoulder means is formed by a groove which is generally wedge-shaped, converging from an outer diameter of said carrier sleeve in a direction toward said thrust face, and wherein said ring member is mounted to said groove such that a radially inner end surface thereof engages said first annular shoulder.

14. An assembly according to claim 11, wherein said flexible annular ring member is formed from an elastomeric rubber-like material.

15. An assembly according to claim 16 wherein said bearing has a radially inwardly extending shoulder portion comprising said second annular shoulder and having a first generally annular surface facing in the direction of said thrust face for engagement with an outer diameter surface portion of said flexible annular ring, and an oppositely facing surface; and wherein said carrier sleeve has a cylindrical surface portion for receiving an inner diameter surface portion of the flexible annular ring and a radially outwardly extending shoulder portion spaced therefrom for abutment with said oppositely facing surface of said bearing, said carrier sleeve shoulder portion having a rearward arcuate curvature for permitting a predetermined amount of sliding and tilting movement of said bearing shoulder portion relative thereto to permit a like amount of tilting of said thrust face relative to said carrier sleeve as required for alignment of said thrust face with said clutch fingers.

16. An assembly according to claim 15 wherein said oppositely facing surface portion of said bearing has an arcuate surface of complementary form for complementary engagement with the arcuate surface of said carrier sleeve shoulder portion to facilitate said sliding engagement therebetween.

17. An assembly according to claim 15 wherein said bearing includes a first annular member having said annular thrust face on one surface thereof and a first annular raceway on a generally oppositely oriented surface thereof, a second annular member having a second annular raceway formed thereon in facing relation to said first annular raceway, a plurality of bearing elements disposed between and engaging the respective raceways, and an annular shell housing member overlying the first and second annular members and adapted to be mounted in surrounding relation to said carrier sleeve; said bearing inwardly extending shoulder portion being formed on said second annular member and terminating at a position radially spaced apart from said carrier sleeve.

18. An assembly according to claim 16 wherein said bearing includes a first annular member having said annular thrust face on one surface thereof and a first annular raceway on a generally oppositely oriented surface thereof, a second annular member having a second annular raceway formed thereon and facing relation to said first annular raceway, a plurality of bearing elements disposed between an engagingly respective raceways, and an annular shell housing memeber overlying the first and second annular members and adapted to be mounted in surrounding relation to said carrier sleeve; said bearing inwardly extending shoulder portion being formed on said second annular member and terminating at a position radially spaced apart from said carrier sleeve.

* * * * *